US011437913B2

(12) United States Patent
Kobayashi et al.

(10) Patent No.: US 11,437,913 B2
(45) Date of Patent: Sep. 6, 2022

(54) SWITCHING CONTROL CIRCUIT AND POWER SUPPLY CIRCUIT

(71) Applicant: FUJI ELECTRIC CO., LTD., Kawasaki (JP)

(72) Inventors: Yoshinori Kobayashi, Matsumoto (JP); Jian Chen, Matsumoto (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 60 days.

(21) Appl. No.: 17/001,168

(22) Filed: Aug. 24, 2020

(65) Prior Publication Data

US 2021/0111631 A1 Apr. 15, 2021

(30) Foreign Application Priority Data

Oct. 15, 2019 (JP) .............................. JP2019-188850
Feb. 5, 2020 (JP) .............................. JP2020-017813

(51) Int. Cl.
*H02M 3/335* (2006.01)
*H02M 1/08* (2006.01)
*H02M 1/00* (2006.01)

(52) U.S. Cl.
CPC ......... *H02M 3/33569* (2013.01); *H02M 1/08* (2013.01); *H02M 1/0035* (2021.05)

(58) Field of Classification Search
CPC .. H02M 3/33569; H02M 1/0035; H02M 3/01; H02M 3/33571
See application file for complete search history.

(56) References Cited

U.S. PATENT DOCUMENTS

| 2015/0280586 | A1* | 10/2015 | Pasqua | H02M 3/33523 363/21.13 |
| 2018/0342954 | A1* | 11/2018 | Chung | H02M 3/33507 |
| 2020/0089295 | A1* | 3/2020 | Sato | H02J 7/00 |
| 2020/0195154 | A1* | 6/2020 | Mayell | H02M 1/083 |

FOREIGN PATENT DOCUMENTS

| JP | 2005-278376 A | 10/2005 |
| JP | 2017-103889 A | 6/2017 |
| JP | 2017-147854 A | 8/2017 |
| JP | 2017-200294 A | 11/2017 |

* cited by examiner

*Primary Examiner* — Kyle J Moody
(74) *Attorney, Agent, or Firm* — Rabin & Berdo, P.C.

(57) ABSTRACT

A switching control circuit for controlling a power supply circuit having a transformer and a transistor. The switching control circuit is configured to operate based on a power supply voltage that corresponds to a voltage from an auxiliary coil of the transformer. The switching control circuit includes a drive signal output circuit that outputs a drive signal that corresponds to an operation mode of the power supply circuit, the operation mode including a burst mode, a drive circuit that performs switching of the transistor based on the drive signal outputted by the drive signal output circuit, and a control circuit that outputs, to the drive signal output circuit, a control signal for operating the power supply circuit in the burst mode, when a first transition condition or a second transition condition is satisfied, the first transition condition including time as a condition, and the second transition condition not including time as a condition.

8 Claims, 12 Drawing Sheets

|  | S20 | S21 | S22 | S30 | S31 | S32 | S40 |
|---|---|---|---|---|---|---|---|
|  | Vfb<V6<br>Vca<V8<br>T=Tx | Vfb<V6<br>Vca<V10<br>T=Tx | Vfb<V20<br>Vcc<V2 | Vfb<V6<br>Vca<V10<br>T=Tx | Vfb<V20<br>Vcc<V2 | Vfb>V5<br>OR<br>Vca>V7 | Vfb>V5<br>OR<br>Vca>V9 |
| NORMAL MODE | HIGH | — | — | — | — | — | — |
| HIGH FREQUENCY BURST MODE | — | LOW | LOW | — | — | — | — |
| LOW FREQUENCY BURST MODE | — | — | — | LOW | LOW | NORMAL | — |
|  | — | — | — | — | — | — | NORMAL |

FIG.11

SWITCHING CONTROL CIRCUIT AND POWER SUPPLY CIRCUIT

CROSS-REFERENCE TO RELATED APPLICATION

The present application claims priority pursuant to 35 U.S.C. § 119 from Japanese patent application numbers 2019-188850 and 2020-017813, filed on Oct. 15, 2019 and Feb. 5, 2020, respectively, the entire disclosure of which is hereby incorporated by reference herein.

BACKGROUND

Technical Field

The present disclosure relates to a switching control circuit and a power supply circuit.

Description of the Related Art

The switching power supply circuit includes a circuit that operates in a burst mode in which a switching operation is intermittently stopped to enhance the efficiency at a light load (for example, Japanese Patent Application Publication No. 2017-147854).

Incidentally, when a power supply voltage to a control circuit of the switching power supply circuit is generated based on a switching operation, the power supply voltage may drop so that the control circuit may not operates normally, unless the operation mode of the switching power supply circuit is shifted from a normal mode to the burst mode in an appropriate timing.

Further, for example, if the switching power supply circuit continues to operate in the burst mode when the load changes transiently, an output voltage may greatly deviate form a target level.

The present disclosure has been achieved in view of such an issue as described above, and an object thereof is to provide a switching control circuit capable of operating a switching power supply circuit in an appropriate mode.

SUMMARY

A first aspect of the present disclosure to solve an issue described above is a switching control circuit for controlling a power supply circuit that includes a transformer including a primary coil provided on a primary side, a secondary coil provided on a secondary side, and an auxiliary coil magnetically coupled to the primary coil or the secondary coil, and a transistor that controls a current of the primary coil, and that is configured to generate an output voltage of a target level on the secondary side, the power supply circuit having a load connected to an output thereof, the switching control circuit being configured to operate based on a power supply voltage that corresponds to a voltage from the auxiliary coil of the power supply circuit, and control switching of the transistor, the switching control circuit comprising: a drive signal output circuit that outputs a drive signal that corresponds to an operation mode of the power supply circuit, the operation mode including a burst mode; a drive circuit that performs the switching of the transistor based on the drive signal outputted by the drive signal output circuit; and a control circuit that outputs, to the drive signal output circuit, a control signal for operating the power supply circuit in the burst mode, when a first transition condition or a second transition condition is satisfied, the first transition condition including time as a condition, the second transition condition not including time as a condition.

A second aspect of the present disclosure is a switching control circuit for controlling a power supply circuit that includes a transformer including a primary coil provided on a primary side, a secondary coil provided on a secondary side, and an auxiliary coil magnetically coupled to the primary coil or the secondary coil, and a transistor that controls a current of the primary coil, and that is configured to generate an output voltage of a target level on the secondary side, the power supply circuit having a load connected to an output thereof, the switching control circuit being configured to operate based on a power supply voltage that corresponds to a voltage from the auxiliary coil of the power supply circuit, and control switching of the transistor, the switching control circuit comprising: a drive signal output circuit that outputs a drive signal that corresponds to an operation mode of the power supply circuit, the operation mode including a normal mode and a plurality of burst modes; a drive circuit that performs the switching of the transistor based on the drive signal outputted by the drive signal output circuit; and a control circuit that sends a control signal to the drive signal output circuit, to thereby cause the drive signal output circuit to output the drive signal for operating the power supply circuit in one of the burst modes that corresponds to power consumption of the load, when the power consumption of the load decreases during an operation of the power supply circuit in the normal mode, and in the normal mode, when the power consumption of the load increases during an operation of the power supply circuit in one of the burst modes in which the load has lowest power consumption.

A third aspect of the present disclosure is a power supply circuit comprising: a transformer that includes a primary coil provided on a primary side, a secondary coil provided on a secondary side, and an auxiliary coil magnetically coupled to the primary coil or the secondary coil; a transistor that controls a current of the primary coil; and a switching control circuit that operates based on a power supply voltage that corresponds to a voltage from the auxiliary coil, and controls switching of the transistor, the power supply circuit being configured to generate an output voltage of a target level on the secondary side, the switching control circuit including a drive signal output circuit that outputs a drive signal that corresponds to an operation mode of the power supply circuit, the operation mode including a burst mode, a drive circuit that performs the switching of the transistor based on the drive signal outputted by the drive signal output circuit, and a control circuit that outputs, to the drive signal output circuit, a control signal for operating the power supply circuit in the burst mode, when a first transition condition or a second transition condition is satisfied, the first transition condition including time as a condition, the second transition condition not including time as a condition.

A fourth aspect of the present disclosure is a power supply circuit having a load connected to an output thereof, comprising: a transformer that includes a primary coil provided on a primary side, a secondary coil provided on a secondary side, and an auxiliary coil magnetically coupled to the primary coil or the secondary coil; a transistor that controls a current of the primary coil; and a switching control circuit that operates based on a power supply voltage that corresponds to a voltage from the auxiliary coil, and controls switching of the transistor, the power supply circuit being configured to generate an output voltage of a target level on the secondary side, the switching control circuit including a drive signal output circuit that outputs a drive signal that corresponds to an operation mode of the power supply circuit, the operation mode including a normal mode and a plurality of burst modes, a drive circuit that performs the switching of the transistor based on the drive signal outputted by the drive signal output circuit, and a control circuit that sends a control signal to the drive signal output circuit, to thereby cause the drive signal output circuit to output the drive signal for operating the power supply circuit in one of the burst modes that corresponds to power consumption of the load, when the power consumption of the load decreases during an operation of the power supply circuit in the normal mode, and in the normal mode, when the power consumption of the load increases during the operation of the power supply circuit in one of the burst modes in which the load has lowest power consumption.

According to the present disclosure, a switching control circuit capable of operating a switching power supply circuit in an appropriate operation mode can be provided.

BRIEF DESCRIPTION OF THE DRAWINGS

FIG. 11 is a state transition chart of an operation mode.

DETAILED DESCRIPTION

At least the following details will become apparent from descriptions of the present specification and of the accompanying drawings.

Embodiment of the Present Disclosure

<<<Outline of Switching Power Supply Circuit 10>>>

Figure 1:
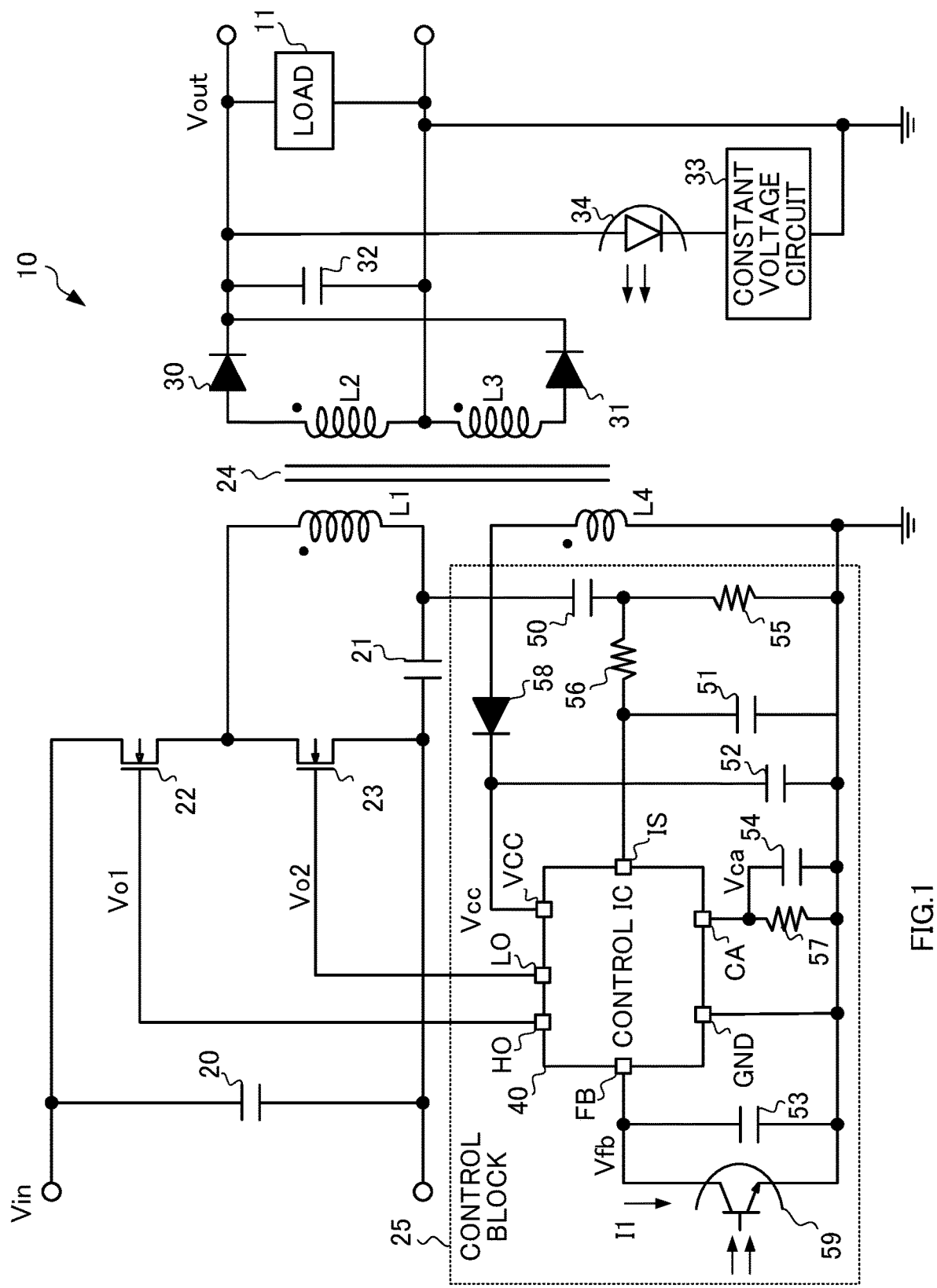
FIG. 1 is a diagram illustrating one example of a switching power supply circuit 10.

FIG. 1 is a diagram illustrating a configuration of a switching power supply circuit 10 according to an embodiment of the present disclosure. The switching power supply circuit 10 is an LLC current resonant converter that generates an output voltage Vout of a target level at a load 11 from a predetermined input voltage Vin.

The switching power supply circuit 10 comprises capacitors 20, 21, 32, NMOS transistors 22, 23, a transformer 24, a control block 25, diodes 30, 31, a constant voltage circuit 33, and a light emitting diode 34.

The capacitor 20 stabilizes voltage between a power supply line, to which the input voltage Vin is to be applied, and a ground line on the ground side, and removes noise and the like. Note that the input voltage Vin is a DC voltage of a predetermined level. The capacitor 21 is a so-called resonant capacitor that configures a resonant circuit with a leakage inductance between a primary coil L1 and secondary coils L2, L3.

The NMOS transistor 22 is a high-side power transistor, and the NMOS transistor 23 is a low-side power transistor. Note that the NMOS transistors 22, 23 are used as a switching device in an embodiment of the present disclosure, however, for example, a PMOS transistor or a bipolar transistor may be used.

The transformer 24 comprises the primary coil L1, the secondary coils L2, L3, and an auxiliary coil L4, where the primary coil L1, the secondary coils L2, L3, and the auxiliary coil L4 are insulated from one another. In the transformer 24, voltage is generated in the secondary coils L2, L3 on the secondary side according to a change in the voltage across the primary coil L1 on the primary side. Similarly, voltage is generated in the auxiliary coil L4 on the primary side according to a change in the voltage across the primary coil L1 on the primary side, by extension to a change in the voltage of the secondary coils L2, L3.

Further, the primary coil L1 has one end coupled to the source of the NMOS transistor 22 and the drain of the NMOS transistor 23, and the other end coupled to the source of the NMOS transistor 23 via the capacitor 21.

Accordingly, when switching of the NMOS transistors 22, 23 is started, the voltage in each of the secondary coils L2, L3 and the auxiliary coil L4 changes. Note that the primary coil L1 and the secondary coils L2, L3 are magnetically coupled with the same polarity, while the secondary coils L2, L3 and the auxiliary coil L4 are also magnetically coupled with the same polarity.

The control block 25 is a circuit block for controlling switching of the NMOS transistors 22, 23, and the details thereof will be described later.

The diodes 30, 31 rectify the voltage in the secondary coils L2, L3, and the capacitor 32 smooths the rectified voltage. As a result, the smoothed output voltage Vout is generated in the capacitor 32. Note that the output voltage Vout results in a DC voltage of a target level.

The constant voltage circuit 33 is a circuit that generates a constant DC voltage, and is configured using a shunt regulator, for example.

The light emitting diode 34 is a device that emits light having an intensity corresponding to a difference between the output voltage Vout and the output of the constant voltage circuit 33, and configures a photocoupler with a phototransistor 59 which will be described later. In an embodiment of the present disclosure, as the level of the output voltage Vout rises, the intensity of the light emitted from the light emitting diode 34 increases.

<<<Control Block 25>>>

The control block 25 includes a control IC 40, capacitors 50 to 54, resistors 55 to 57, a diode 58, and the phototransistor 59.

The control IC 40 is an integrated circuit that controls switching of the NMOS transistors 22, 23, and has terminals VCC, GND, FB, IS, CA, HO, LO. Note that the control IC 40 corresponds to a "switching control circuit".

The terminal VCC is a terminal to be applied with a power supply voltage Vcc for operating the control IC 40. The terminal VCC is coupled to one end of the capacitor 52 having the other end grounded and to the cathode of the diode 58. Accordingly, the capacitor 52 is charged with a current from the diode 58, and the charging voltage of the capacitor 52 results in the power supply voltage Vcc for operating the control IC 40. Note that the control IC 40 is activated by being applied with a divided voltage of the input voltage Vin obtained by rectifying an AC input via a terminal not illustrated, and after activation, is operated based on the power supply voltage Vcc.

The terminal GND is a terminal to be applied with a ground voltage and coupled to the housing or the like of a device in which the switching power supply circuit 10 is mounted, for example.

The terminal FB is a terminal at which a feedback voltage Vfb corresponding to the output voltage Vout is to be generated and to which the capacitor 53 and the phototransistor 59 are coupled. The capacitor 53 is provided to remove noise between the terminal FB and ground, the phototransistor 59 passes a bias current I1 having a magnitude corresponding to the intensity of the light emitted from the light emitting diode 34, from the terminal FB to ground. Thus, the phototransistor 59 operates as a transistor that generates a sink current.

The terminal IS is a terminal for detecting a current value of the resonant current of the primary coil L1. Here, at the node coupled with the capacitor 50 and the resistor 55, a voltage corresponding to the current value of the resonant current of the primary coil L1 is generated. The resistor 56 and the capacitor 51 configures a low pass filter. Accordingly, a voltage obtained by removing a noise component is to be applied to the terminal IS according to the current value of the resonant current of the primary coil L1.

The terminal CA is a terminal to be applied with a voltage Vca that is generated based on the resonant current of the primary coil L1 and that corresponds to the input power of the switching power supply circuit 10. As will be described later in detail, the terminal CA is coupled with the capacitor 54 and the resistor 57.

The terminal HO is a terminal from which a signal Vo1 for driving the NMOS transistor 22 is output, and to which the gate of the NMOS transistor 22 is coupled.

The terminal LO is a terminal from which a signal Vo2 for driving the NMOS transistor 23 is output, and to which the gate of the NMOS transistor 23 is coupled.

<<<Details of Control IC 40>>>

Figure 2:
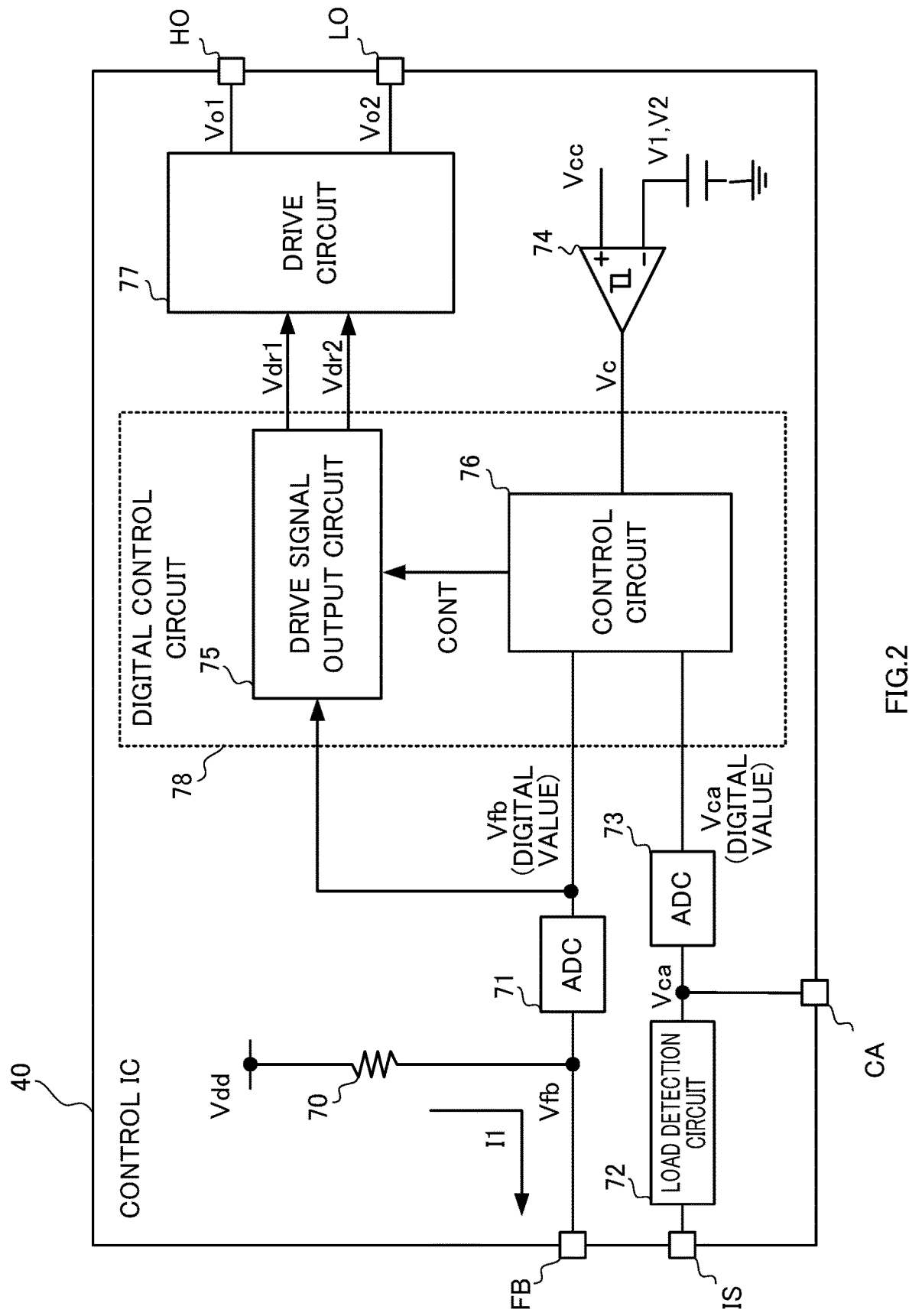
FIG. 2 is a diagram illustrating one example of a control IC 40.

FIG. 2 is a diagram illustrating a configuration of the control IC 40. The control IC 40 includes a resistor 70, AD converters 71, 73, a load detection circuit 72, a comparator 74, a drive signal output circuit 75, a control circuit 76, and a drive circuit 77. Note that the terminals VCC, GND, and IS are omitted here. As will be described later in detail, the drive signal output circuit 75 and the control circuit 76 configure a digital control circuit 78.

The resistor 70 generates the feedback voltage Vfb based on the bias current I1 from the phototransistor 59.

Note that the resistor 70 has one end to be applied with a predetermined voltage Vdd, and the other end coupled to the terminal FB. Accordingly, the feedback voltage Vfb generated at the terminal FB is given by Expression (1).

$$Vfb = Vdd - R \times I1 \quad (1)$$

where "R" てえ resistance value of the resistor 70.

As described above, in an embodiment of the present disclosure, the current value of the bias current I1 increases with rise in the output voltage Vout. Accordingly, when the output voltage Vout rises, the feedback voltage Vfb drops.

The AD converter 71 converts the feedback voltage Vfb at the terminal FB into a digital value and outputs the result. The load detection circuit 72 smooths a voltage corresponding to the resonant current of the primary coil L1 detected at the terminal IS, using the resistor 57 and the capacitor 54 coupled to the terminal CA, and outputs the result as the voltage Vca.

Here, the current value of the resonant current of the primary coil L1 increases according to the input power of the switching power supply circuit 10, and the input power of the switching power supply circuit 10 increases according to the power to be consumed by the load 11. Accordingly, the voltage Vca to be applied to the terminal CA results in a value that increases with increase in power consumption of the load 11.

The AD converter 73 converts the voltage Vca output by the load detection circuit 72 into a digital value, and outputs the result. The comparator 74 detects a drop in the power supply voltage Vcc.

The comparator 74 is a hysteresis comparator that compares the power supply voltage Vcc with a voltage V1, which is a high threshold voltage, as well as compares the power supply voltage Vcc with a voltage V2 (<V1), which is a low threshold voltage.

The comparator 74 changes a voltage Vc indicative of the comparison result to a low level (hereinafter, referred to as "low") when the power supply voltage Vcc drops below the "voltage V2". Further, the comparator 74 changes the voltage Vc to a high level (hereinafter, referred to as "high") when the power supply voltage Vcc rises above the "voltage V1".

The digital control circuit 78 is a circuit that outputs drive voltages Vdr1, Vdr2 based on the feedback voltage Vfb, the voltage Vca, and the voltage Vc, and includes the drive signal output circuit 75 and the control circuit 76.

The drive signal output circuit 75 is a circuit that outputs drive signals Vdr1, Vdr2 corresponding to the operation mode of the switching power supply circuit 10 based on a control signal CONT from the control circuit 76.

As will be described later in detail, the "operation mode" of the switching power supply circuit 10 according to an embodiment of the present disclosure includes three modes of a "normal mode", a "high frequency burst mode", and a "low frequency burst mode".

The "normal mode" is, for example, a mode in which a switching operation is continuously performed and the switching operation is not intermittently stopped. A "burst mode" is, for example, a mode in which the switching operation is intermittently stopped.

Further, the "high frequency burst mode" in the "burst mode" is a mode in which a period during which the switching operation is intermittently stopped is shorter the period as in the "low frequency burst mode". Accordingly, when comparing the "high frequency burst mode" with the "low frequency burst mode", the "low frequency burst mode" is preferable as an operation mode when the load 11 is a lighter load.

The control circuit 76 controls various operations of the drive signal output circuit 75 based on the control signal CONT. For example, the control circuit 76 outputs, to the drive signal output circuit 75, the drive signals Vdr1, Vdr2 corresponding to any one mode of, for example, the three "operation modes", based on the voltage Vca and the feedback voltage Vfb varying with the power consumption of the load 11 and the power supply voltage Vcc. The control circuit 76 will be described later in detail.

The drive circuit 77 is a buffer that performs switching of the NMOS transistors 22, 23 based on the input drive signals Vdr1, Vdr2. In specific, the drive circuit drives the NMOS transistor 22 using the signal Vo1 having the same logic level as that of the drive signal Vdr1, and drives the NMOS transistor 23 using the signal Vo2 having the same logic level as that of the signal Vdr2.

<<Details of Drive Signal Output Circuit 75>>

Figure 3:
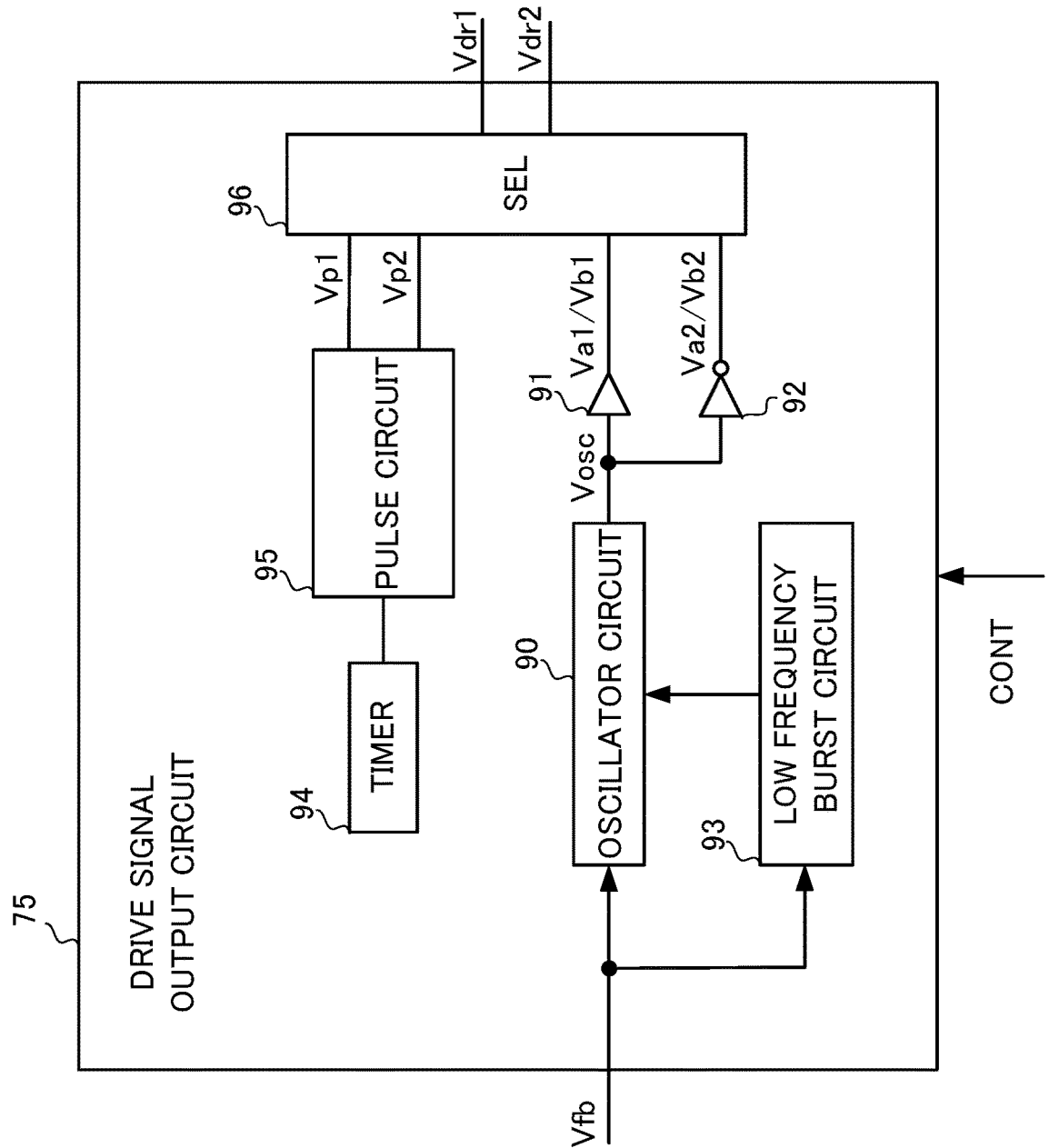
FIG. 3 is a diagram illustrating one example of a drive signal output circuit 75.

FIG. 3 is a diagram illustrating one example of a configuration of the drive signal output circuit 75. The drive signal output circuit 75 includes an oscillator circuit 90, a buffer 91, an inverter 92, a low frequency burst control circuit 93, a timer 94, a pulse circuit 95, and a selector 96. Although not illustrated here for convenience, the control signal CONT is input to the circuits other than the buffer 91 and the inverter 92 among the circuits in the drive signal output circuit 75.

Signals Va1, Va2 in "Normal Mode"

The oscillator circuit 90, the buffer 91, and the inverter 92 are blocks configured to output signals Va1, Va2 for operating the switching power supply circuit 10 in the "normal mode" when the control signal CONT indicative of the "normal mode" is input.

The oscillator circuit 90 is a voltage control oscillator circuit that outputs an oscillator signal Vosc, for example, having 50% duty cycle of a high level based on the input feedback voltage Vfb. The oscillator circuit 90 outputs the oscillator signal Vosc having a high frequency when the level of the feedback voltage Vfb drops. Further, the oscillator circuit 90 outputs the oscillator signal Vosc corresponding to the feedback voltage Vfb, when the control signal CONT indicative of "Operation" is input, and stops outputting the oscillator signal Vosc, when the control signal CONT indicative of "Stop" is input.

Figure 4:
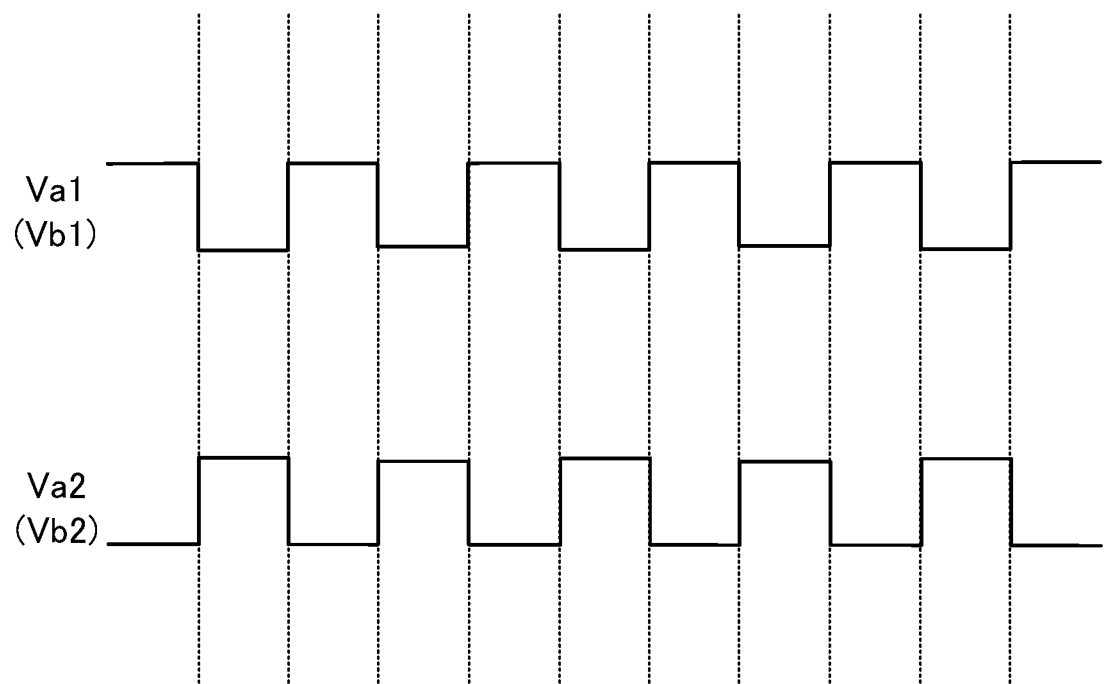
FIG. 4 is a diagram for explaining signals Va1, Va2.

The buffer 91 outputs a signal having the same logic level as that of the oscillator signal Vosc, while the inverter 92 inverts the logic level of the oscillator signal Vosc and output the result. As a result, the signals Va1, Va2 for operating the switching power supply circuit 10 in the "normal mode" have phases opposite to each other, for example, as illustrated in FIG. 4.

Further, the selector 96 selects the signals Va1, Va2, which are outputs of the buffer 91 and the inverter 92, and outputs the selected signals as the drive signals Vdr1, Vdr2, when the control signal CONT indicative of the "normal mode" is input. As a result, the NMOS transistors 22, 23 are driven based on the signals Va1, Va2 in the "normal mode".

Note that, during the operation of the switching power supply circuit 10 in the "normal mode", when the level of the output voltage Vout rises above a target level, the feedback voltage Vfb drops, and thus the frequency of the oscillator signal Vosc rises.

Figure 5:
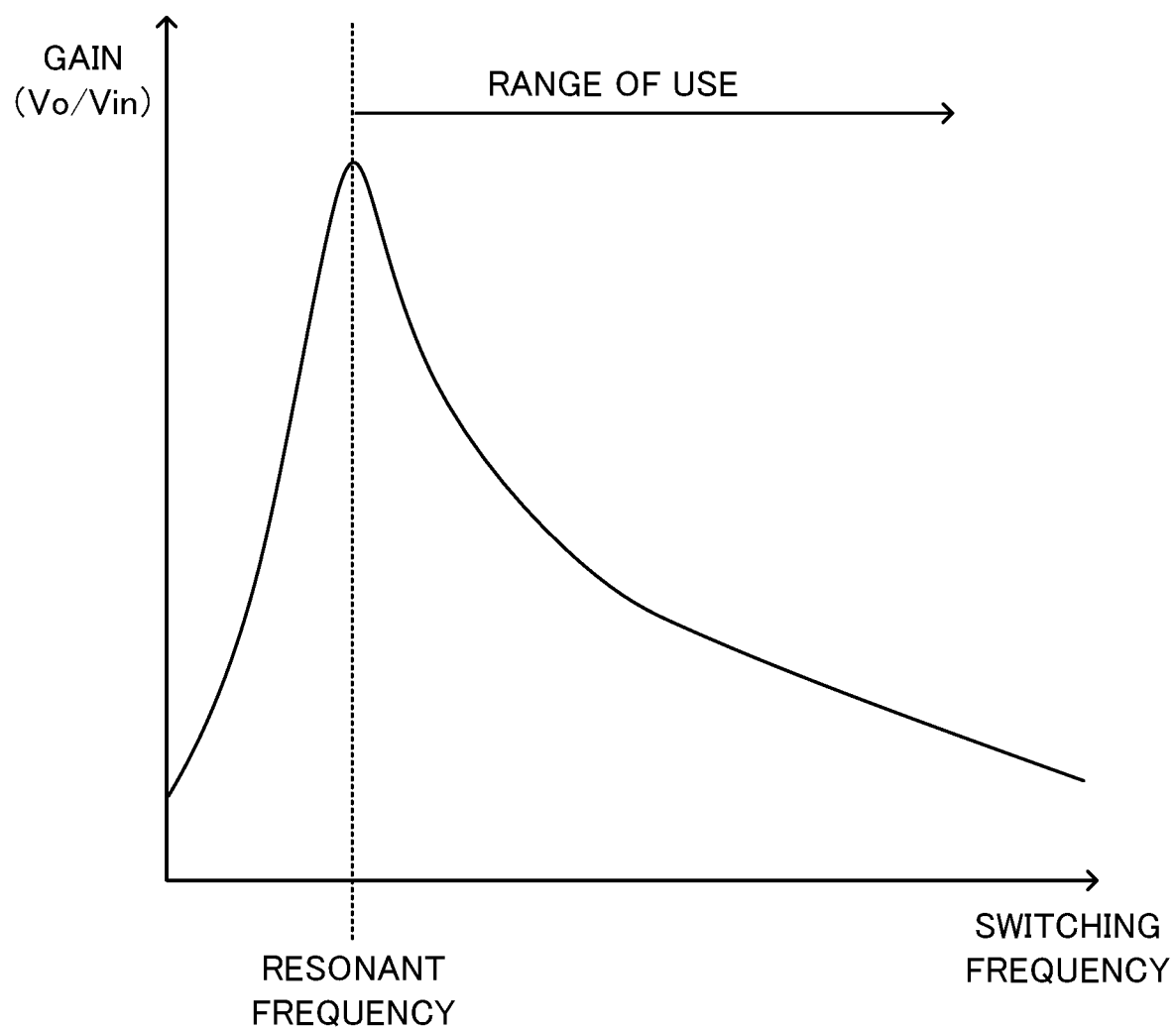
FIG. 5 is a diagram for explaining the relationship between a gain and a switching frequency.

Here, the relationship illustrated in FIG. 5, for example, is established between a gain (=Vout/Vin) of the switching power supply circuit 10, which is an LLC current resonant converter, and a switching frequency. Then, an embodiment of the present disclosure is designed such that the frequency of the oscillator signal Vosc is higher than the resonant frequency of the switching power supply circuit 10. As a result, when the feedback voltage Vfb drops and the frequency of the oscillator signal Vosc rises, the output voltage Vout drops.

In contrast, the level of the output voltage Vout drops below the target level, the feedback voltage Vfb rises, and thus the frequency of the oscillator signal Vosc drops. As a result, the output voltage Vout of the switching power supply circuit 10 rises. Accordingly, when the switching power supply circuit 10 is operated in the "normal mode", the switching power supply circuit 10 is able to generate the output voltage Vout at the target level.

Signals Vb1, Vb2 in "Low Frequency Burst Mode"

The oscillator circuit 90, the buffer 91, the inverter 92, and the low frequency burst control circuit 93 are blocks configured to output signals Vb1, Vb2 for operating the switching power supply circuit 10 in the "low frequency burst mode" when the control signal CONT indicative of the "low frequency burst mode" is input.

The low frequency burst control circuit 93 is a circuit that controls the operation of the oscillator circuit 90 such that a switching cycle is intermittently stopped. The low frequency burst control circuit 93 causes the oscillator circuit 90 to operate to generate the oscillator signal Vosc corresponding to the feedback voltage Vfb, when the feedback voltage Vfb rises above a "voltage V3".

In contrast, the low frequency burst control circuit 93 stops the operation of the oscillator circuit 90, when the feedback voltage Vfb drops below a "voltage V4".

Figure 6:
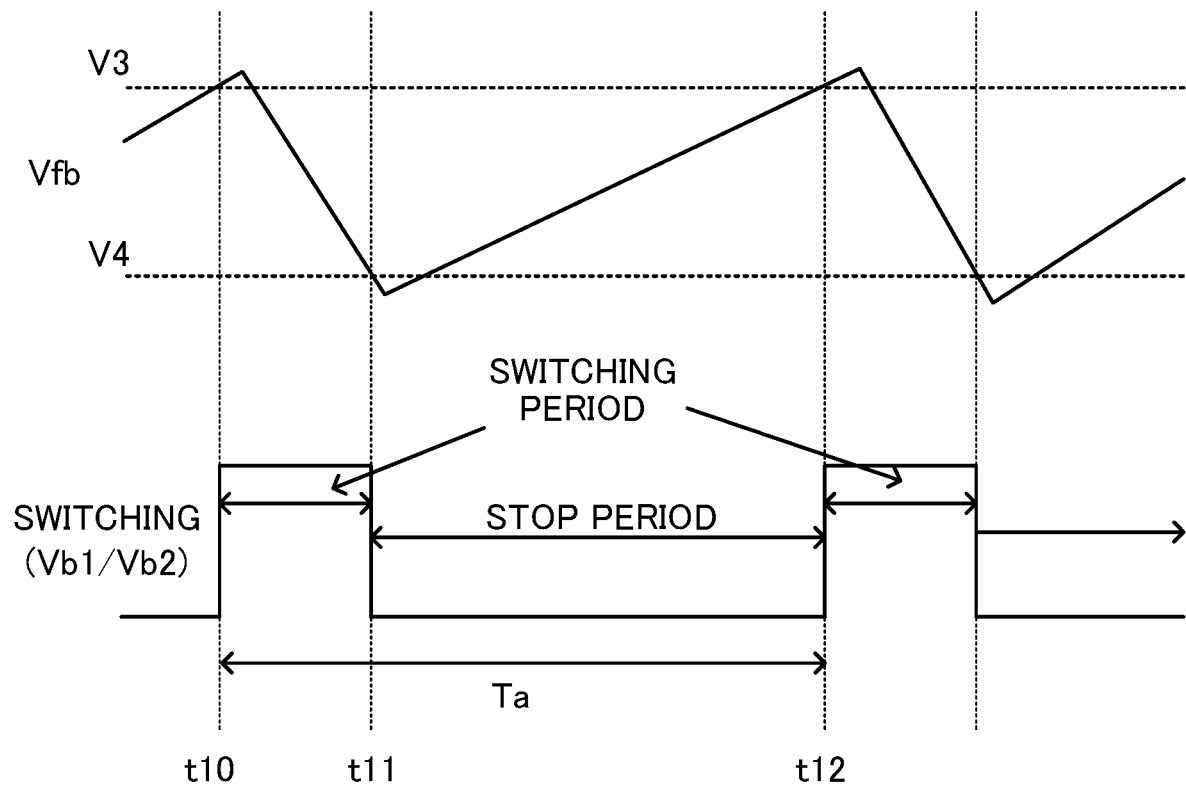
FIG. 6 is a diagram for explaining timing in which signals Vb1, Vb2 are generated.

FIG. 6 is a diagram for explaining timing in which the signals Vb1, Vb2 in the "low frequency burst mode" are generated.

For example, when the feedback voltage Vfb rises and reaches the "voltage V3" at time t10, the oscillator signal Vosc is generated. The buffer 91 outputs the signal Vb1 having the same logic level as that of the oscillator signal Vosc, while the inverter 92 outputs the signal Vb2 obtained by inverting the logic level of the oscillator signal Vosc. As a result, the signals Vb1, Vb2 in the "low frequency burst mode" have waveforms similar to those of the signals Va1, Va2 illustrated in FIG. 4.

Further, the selector 96 selects the signals Vb1, Vb2, which are the outputs of the buffer 91 and the inverter 92, and outputs the selected signals as the drive signals Vdr1, Vdr2, when the control signal CONT indicative of the "low frequency burst mode" is input. As a result, the NMOS transistors 22, 23 are driven based on the signals Vb1, Vb2 in the "low frequency burst mode".

When the NMOS transistors 22, 23 are driven at the time t10, the output voltage Vout rises, and thus the feedback voltage Vfb drops slightly after the time t10. Then, for example, when the feedback voltage Vfb drops and reaches the "voltage V4" at time t11, generation of the oscillator signal Vosc is stopped.

As a result, switching of the NMOS transistors 22, 23 is also stopped, and thus the output voltage Vout drops. Then, the feedback voltage Vfb rises slightly after the time t11, and when the feedback voltage Vfb reaches the "voltage V3", for example, at time t12, the oscillator signal Vosc is generated. As a result, the NMOS transistors 22, 23 are driven based on the signals Vb1, Vb2. Note that the operation from the time t10 to the time t12 is repeated from the time t12.

Accordingly, the low frequency burst control circuit 93 can operate the switching power supply circuit 10 in the "low frequency burst mode" by controlling the oscillator circuit 90 based on the control signal CONT indicative of the "low frequency burst mode".

Note that a time period from the time t10 to the time t12 in FIG. 6 corresponds to a time period Ta, which represents one cycle in the "low frequency burst mode". In an embodiment of the present disclosure, the voltages V3 and V4 and the resistance value R of the resistor 70 that generates the feedback voltage Vfb (see FIG. 2) are set such that a "stop period" during which switching is stopped is set to be sufficiently longer than a "switching period", in the time period Ta.

Pulse Signal Vp1, Vp2 in "High Frequency Burst Mode"

The timer 94 and the pulse circuit 95 are blocks configured to output pulse signals Vp1, Vp2 for operating the switching power supply circuit 10 in the "high frequency burst mode when the control signal CONT indicative of the "high frequency burst mode" is input.

The timer 94 repeatedly measures, for example, a time period Tb, which is one cycle in the "high frequency burst mode", and the pulse circuit 95 outputs a total of three pulse signals Vp1, Vp2 in a predetermined timing in the time period Tb based on the measurement time of the timer 94.

Figure 7:
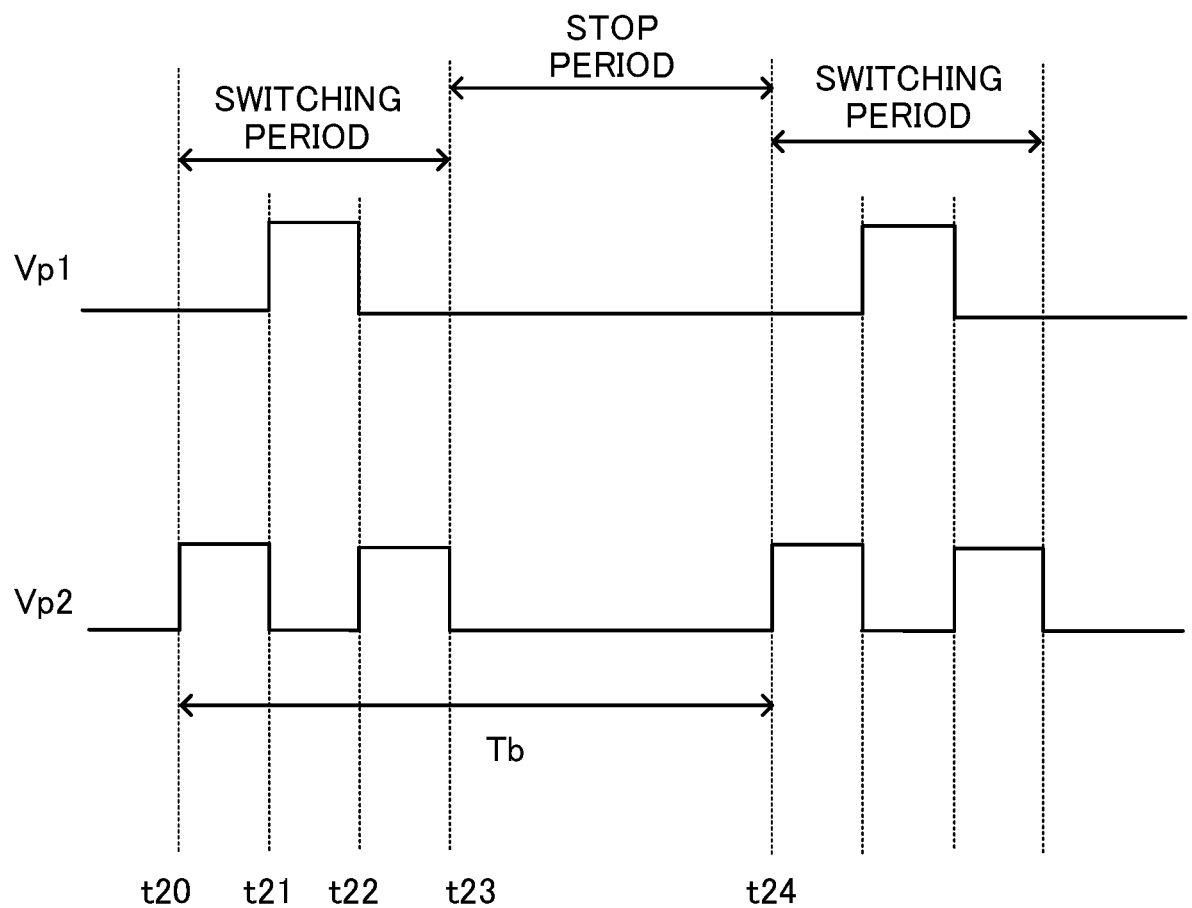
FIG. 7 is a diagram for explaining pulse signals Vp1, Vp2.

FIG. 7 is a diagram for explaining timing in which the pulse signals Vp1, Vp2 in the "high frequency burst mode" are generated.

For example, when the timer 94 starts measuring time at time t20, the pulse circuit 95 outputs the high pulse signal Vp2 until time t21.

Here, the selector 96 selects the pulse signals Vp1, Vp2 and outputs the selected signals as the drive signals Vdr1, Vdr2 when the control signal CONT indicative of the "high frequency burst mode" is input. Accordingly, when the high pulse signal Vp2 is output from the time t20 to the time t21, the drive signal Vdr2 goes high, thereby turning on the NMOS transistor 23.

Further, based on the output of the timer 94, the pulse circuit 95 outputs the high pulse signal Vp1 at the time t21 and outputs it until time t22. As a result, the drive signal Vdr1 is high and the NMOS transistor 22 is on during a time period from the time t21 to the time t22.

Furthermore, based on the output of the timer 94, the pulse circuit 95 outputs the high pulse signal Vp2 at the time t22 and outputs the signal until time t23. As a result, during a time period from the time t21 to the time t22, the drive signal Vdr2 is high and the NMOS transistor 23 is on.

Then, based on the measurement time of the timer 94, the pulse circuit 95 stops generating the pulse signals Vp1, Vp2 during a time period from the time t23 to time t24. Further, at the time t24 at which the time period Tb has elapsed from the time t20, the measurement time of the timer 94 is reset, and the operation from the time t20 to the time t24 will be repeated.

Accordingly, the timer 94 and the pulse circuit 95 are configured to generate the pulse signals Vp1, Vp2 based on the control signal CONT indicative of the "high frequency burst mode", thereby being able to operate the switching power supply circuit 10 in the "high frequency burst mode".

An embodiment of the present disclosure is designed such that the "switching period" per unit time in the "high frequency burst mode" is sufficiently longer than the "switching period" per unit time in the "low frequency burst mode".

Accordingly, in an embodiment of the present disclosure, the "switching period" per unit time is shortened every time when the operation mode changes from the "normal mode" to the "high frequency burst mode", and from the "high frequency burst mode" to the "low frequency burst mode", in the foregoing three operation modes. The shortening of the switching period reduces the power consumption in the drive circuit 77 and the NMOS transistors 22, 23 having a large gate capacitance, for example.

Figure 8:
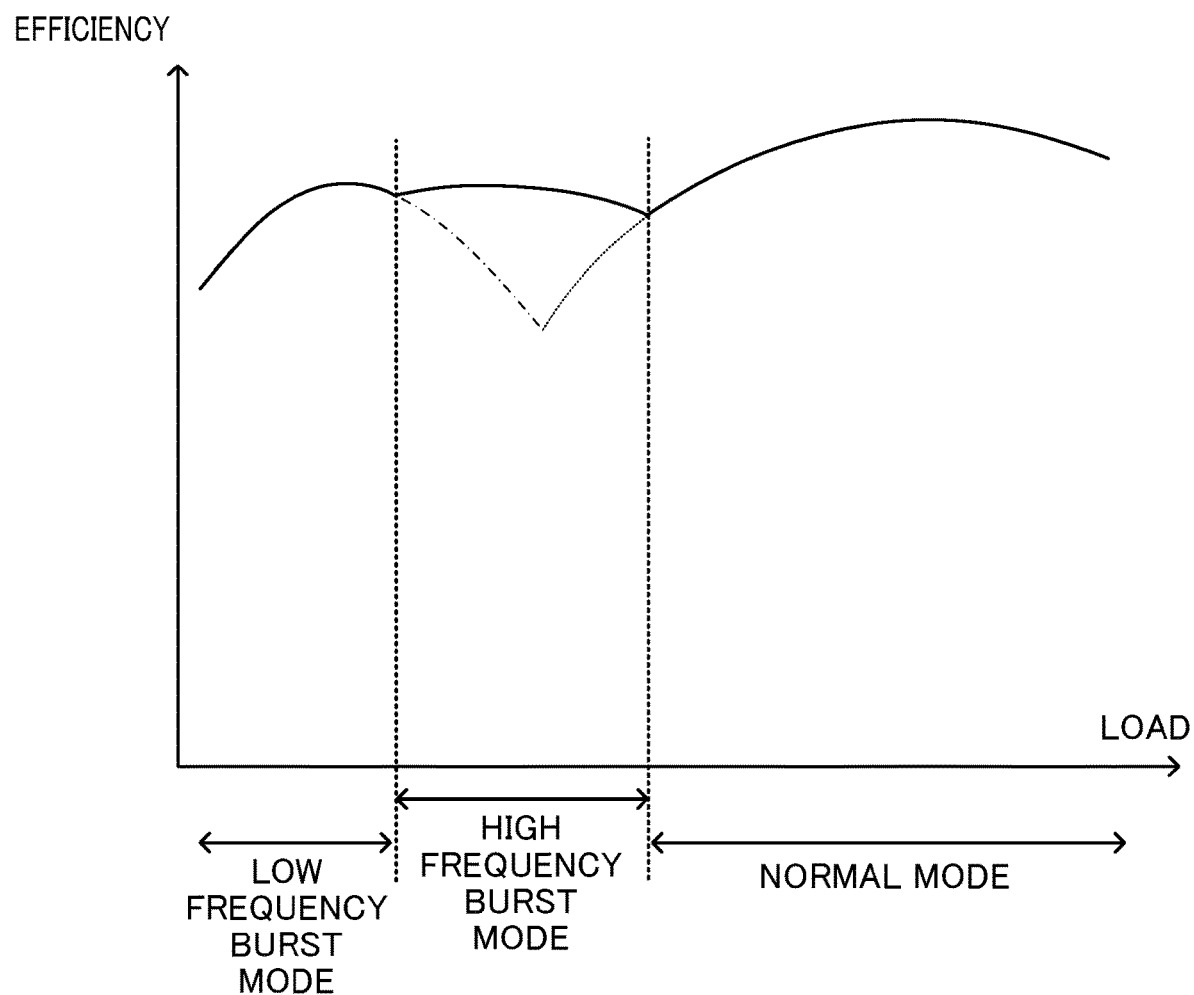
FIG. 8 is a diagram for explaining efficiency of a switching power supply circuit 10.

As a result, for example, as illustrated in FIG. 8, by shifting the "operation mode" of the switching power supply circuit 10 from the "normal mode" via the "high frequency burst mode" to the "low frequency burst mode" as the power consumption of the load 11 decreases, it is possible to enhance the efficiency of the switching power supply circuit 10 in a wide range.

<<Control Circuit 76>>

The control circuit 76 in FIG. 2 is a state machine that controls various operations of the drive signal output circuit 75 based on the feedback voltage Vfb, the voltage Vca, and the voltage Vc. For example, the control circuit generates the control signal CONT for switching the "operation mode" of the switching power supply circuit 10 according to the power consumption of the load 11. Note that the "state machine" means a logic circuit that is logically synthesized such that a state of an output is changed depending on an input condition, for example.

Figure 9:
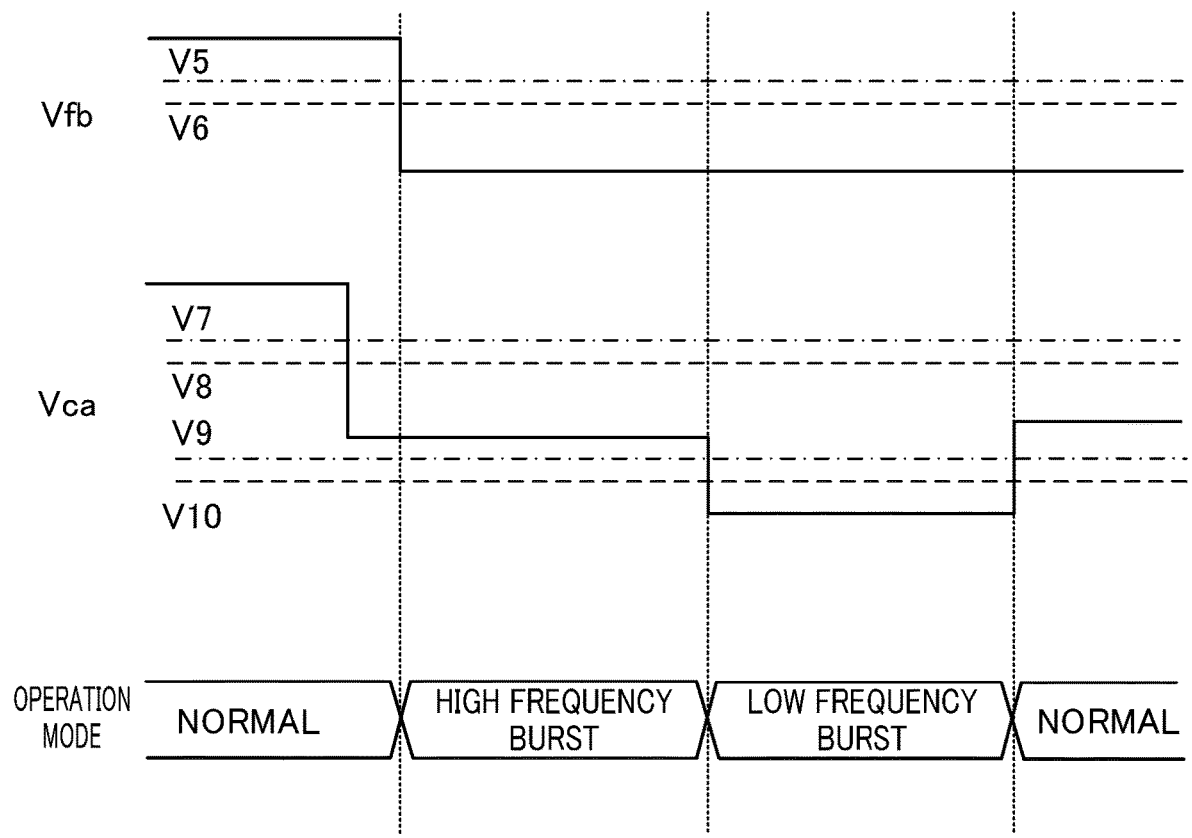
FIG. 9 is a diagram for explaining a transition condition of an operation mode.

FIG. 9 is a diagram illustrating the relationship between the transition condition of the "operation mode", and the feedback voltage Vfb and voltage Vca that change according to the power consumption of the load 11. Here, when the power consumption of the load 11 decreases, the output voltage Vout rises, and thus the feedback voltage Vfb drops. Further, when the power consumption of the load 11 decreases, the voltage Vca drops. Note that FIG. 9 illustrates only the relationship between the transition condition and the levels of the feedback voltage Vfb and the voltage Vca, and accordingly the "transition time" at a time of transition of the "operation mode" will be described later.

In an embodiment of the present disclosure, for example, when the power consumption of the load 11 is large such that the feedback voltage Vfb is higher than a voltage V5 or the voltage Vca is higher than a voltage V7, the "operation mode" is set to the "normal mode". Hereinafter, a case in which the feedback voltage Vfb is higher than the voltage V5 or the voltage Vca is higher than the voltage V7 is referred to as "Condition 1".

Further, when the power consumption of the load 11 decreases such that the feedback voltage Vfb becomes lower than a voltage V6 (<voltage V5) as well as the voltage Vca becomes lower than a voltage V8 (<voltage V7), the "operation mode" is set to the "high frequency burst mode". Hereinafter, a case in which the feedback voltage Vfb is lower than the voltage V6 as well as the voltage Vca is lower than the voltage V8 is referred to as "Condition 2".

Further, when the power consumption of the load 11 significantly decreases such that the feedback voltage Vfb becomes lower than the voltage V6 as well as the voltage Vca becomes lower than a voltage V10 (<voltage V8), the "operation mode" is set to the "low frequency burst mode". Hereinafter, a case in which the feedback voltage Vfb is lower than the voltage V6 as well as the voltage Vca is lower than the voltage V10 is referred to as "Condition 3".

Further, when the "operation mode" is the "low frequency burst mode" and the power consumption of the load increases such that the feedback voltage Vfb becomes higher than the voltage V5 (>voltage V6) or the voltage Vca becomes higher than a voltage V9 (V8<V9<V10), the "operation mode" is set to the "normal mode". Hereinafter, a case in which the feedback voltage Vfb is higher than the voltage V5 or the voltage Vca is higher than the voltage V8 is referred to as "Condition 4".

<<State Transition>>

Figure 10:
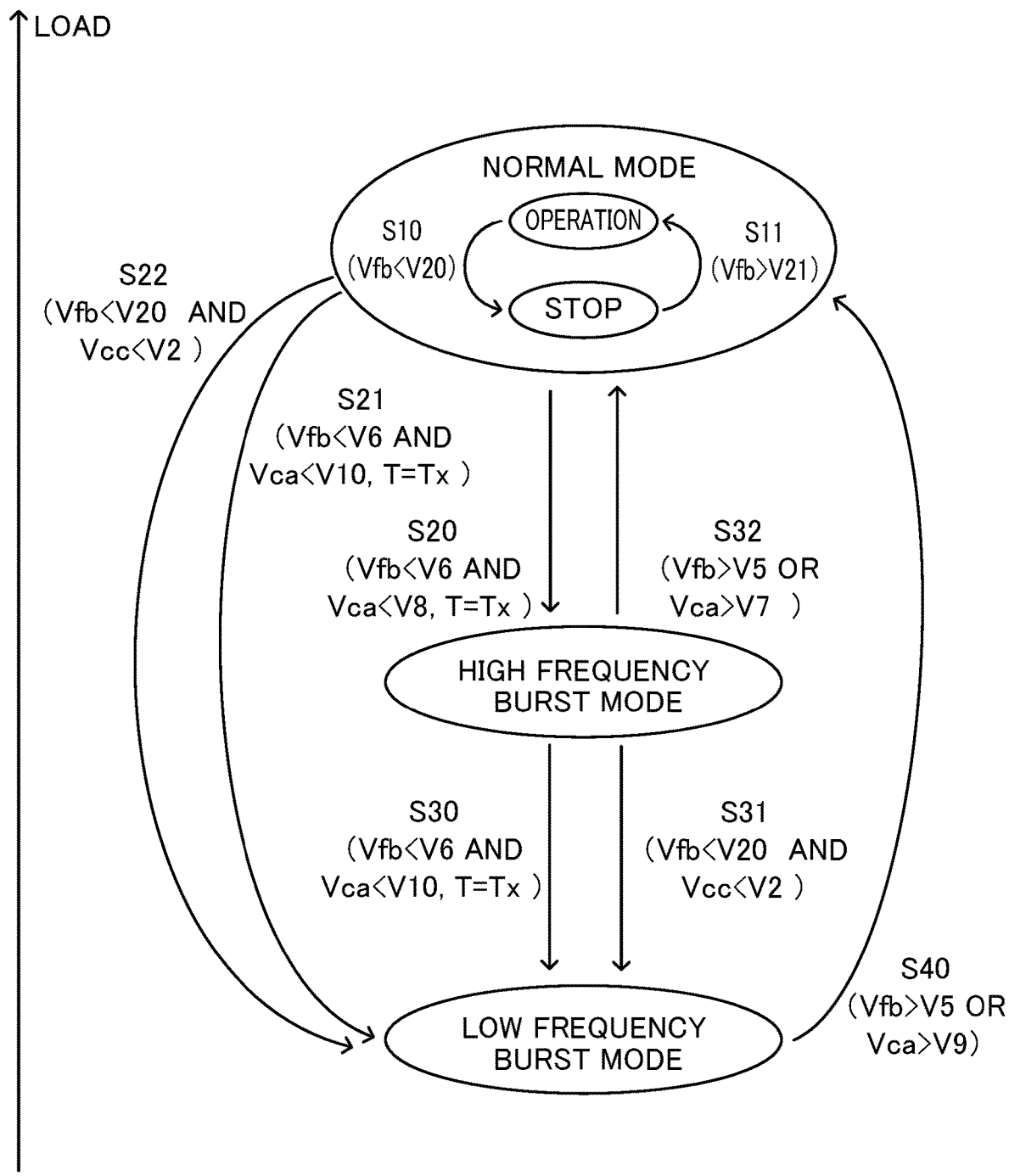
FIG. 10 is a state transition diagram of an operation mode.

FIG. 10 is a state transition diagram for explaining the relationship between the condition of input to the control circuit 76 and the control signal CONT, and FIG. 11 is a state transition chart.

<<Transition within "Normal Mode">>

It is assumed here that the condition of input to the control circuit 76 satisfies "Condition 1 (Vfb>V5 or Vca>V7)", and the "operation mode" is the "normal mode".

Incidentally, as described above, the voltage Vca, which is to be input to the control circuit 76, is generated by smoothing a voltage corresponding to the resonant current of the primary coil L1 using the capacitor 54 and the resistor

57. Thus, even if the state of the load 11 changes, the voltage Vca does not change immediately.

In contrast, the feedback voltage Vfb is generated using the current I1 from the phototransistor 59 and the resistor 70, and thus when the state of the load 11 changes, the feedback voltage Vfb changes in a shorter time period than the voltage Vca does. Thus, in an embodiment of the present disclosure, in the "normal mode", when the load 11 becomes a light load, for example, and only the feedback voltage Vfb drops below a voltage V20 of a predetermined level, the switching operation is temporarily stopped. Note that the "predetermined level" at which the switching operation is stopped corresponds to a "second level".

Specifically, in the "normal mode", when the feedback voltage Vfb drops below the voltage V20 of the predetermined level, the control circuit 76 outputs the control signal CONT indicative of "Stop" (process S10). As a result, the operation of the oscillator circuit 90 in FIG. 3 is stopped, and thus the switching operation is stopped, thereby suppressing overshoot of the output voltage Vout.

Further, in the "normal mode", when the feedback voltage Vfb rises above a voltage V21 (>voltage V20) of a predetermined level, the control circuit 76 outputs the control signal CONT indicative of "Operation" (process S11). As a result, the oscillator circuit 90 generates the oscillator signal Vosc, and thus the switching operation is performed, thereby generating the output voltage Vout of a target level. Note that, in an embodiment of the present disclosure, the voltage V21 is lower than the voltage V6, and the voltages V5, V6, V20, and V21 have a relationship of V5>V6>V21>V20.

<<<Transition from "Normal Mode" to "High Frequency Burst Mode">>>

Incidentally, for example, when the load 11 changes transiently, if the "operation mode" of the switching power supply circuit 10 is immediately shifted to another mode in response to such a change, the output voltage Vout may significantly deviate from the target level.

Thus, in an embodiment of the present disclosure, the control circuit 76 determines whether a time period during which the load 11 has been a light load reaches a "predetermined time period Tx".

Accordingly, when a time period during which the load 11 has been a light load and the condition of input to the control circuit 76 satisfies "Condition 2 (Vfb<V6 and Vca<V8)" continues for the "predetermined time period Tx", the control circuit 76 outputs the control signal CONT indicative of the "high frequency burst mode" (process S20).

As a result, the "operation mode" of the switching power supply circuit 10 is shifted to the "high frequency burst mode".

<<<Transition from "Normal Mode" to "Low Frequency Burst Mode">>>

For example, when the load 11 becomes a lighter load (or no load); the condition of input to the control circuit 76 satisfies "Condition 3 (Vfb<V6 and Vca<V10)"; and "Condition 3" continues for the "predetermined time period Tx", then, the control circuit 76 outputs the control signal CONT indicative of the "low frequency burst mode" (process S21).

As a result, the "operation mode" of the switching power supply circuit 10 is shifted to the "low frequency burst mode".

Incidentally, there may be a case in which the feedback voltage Vfb is lower than the voltage V20 of the predetermined level, and the process S10 is performed, thereby stop switching. Then, when "Condition 3 (Vfb<voltage V6 and Vca<voltage V10)" is satisfied, the power supply voltage Vcc may drop more than necessary and the control IC 40 may not operate properly, since the operation in the "low frequency burst mode" is not started until the "predetermined time period Tx" has elapsed in the process S21.

Thus, in an embodiment of the present disclosure, even if the condition of input to the control circuit 76 does not satisfy "Condition 3 (Vfb<V6 and Vca<V10)", the control circuit 76 outputs the control signal CONT indicative of the "low frequency burst mode", when the feedback voltage Vfb drops below the voltage V20 of the predetermined level; the process S10 is performed; and the voltage Vc goes low, in other words, the power supply voltage Vcc drops below the "voltage V2" (process S22). Note that the condition for execution of the process S22 (hereinafter, referred to as "Condition 5") is the feedback voltage Vfb<V20 and the power supply voltage Vcc<V2.

As a result, when "Condition 3" is satisfied and before the "predetermined time period Tx" has elapsed, the switching power supply circuit 10 operates in the "low frequency burst mode". This can prevent the power supply voltage Vcc from dropping more than necessary.

Note that, in an embodiment of the present disclosure, for example, a state in which "Condition 3 (Vfb<V6 and Vca<V10)" is satisfied corresponds to a "light load state". Further, the process S21 corresponds to a "first transition condition" including time as a condition, the process S22 corresponds to a "second transition condition" not including time as a condition, the voltage V2 corresponds to a "first level", and the "low frequency burst mode" corresponds to a "first burst mode".

<<<Transition from "High Frequency Burst Mode">>>

During the operation of the switching power supply circuit 10 in the "high frequency burst mode", when the condition of input to the control circuit 76 satisfies "Condition 3 (Vfb<V6 and Vca<V10)" and "Condition 3" continues for the "predetermined time period Tx", the control circuit 76 outputs the control signal CONT indicative of the "low frequency burst mode" (process S30). As a result, the "operation mode" of the switching power supply circuit 10 is shifted to the "low frequency burst mode".

Also, during the operation of the switching power supply circuit 10 in the "high frequency burst mode", as in the operation in the "low frequency burst mode", when "Condition 5 (Vfb<V20 and Vcc<V2)" not including time is satisfied, the control circuit 76 outputs the control signal CONT indicative of the "low frequency burst mode" (process S31).

Whereas, the condition of input to the control circuit satisfies "Condition 1 (Vfb>V5 or Vca>V7)", the control circuit 76 outputs the control signal CONT indicative of the "normal mode" (process S32). As a result, the "operation mode" of the switching power supply circuit 10 is shifted to the "normal mode".

<<<Transition from "Low Frequency Burst Mode">>>

During the operation of the switching power supply circuit 10 in the "low frequency burst mode", when the condition of input to the control circuit 76 satisfies "Condition 4 (Vfb>V5 or Vca>V9)", the control circuit outputs the control signal CONT indicative of the "normal mode" (process S40). As a result, the "operation mode" of the switching power supply circuit 10 is shifted to the "normal mode".

As will be described later in detail, in an embodiment of the present disclosure, when the power consumption of the load 11 increases during the operation of the switching power supply circuit 10 in the "low frequency burst mode", the "operation mode" is not shifted to the "high frequency burst mode" but shifted to the "normal mode". During the operation of the switching power supply circuit 10 in the "normal mode", the output voltage Vout can be stabilized in a short time. Accordingly, in an embodiment of the present disclosure, when the power consumption of the load 11 increases, the operation mode is shifted from the "low frequency burst mode" not to the "high frequency burst mode" but to the "normal mode" instead.

<<Waiting Time After Transition of "Operation Mode">>

As described above, when the condition of input to the control circuit 76 satisfies a predetermined condition, the "operation mode" transitions, however, a waiting time after such transition may be set. Specifically, the control circuit 76 prohibits reception of input, in other words, another transition of the operation mode, until a predetermined "waiting time T1 (first time period)" has elapsed since the transition of the "operation mode". As a result, the control signal CONT indicative of the "operation mode" continues to be output at least for the "waiting time T1 (first time period)". This can prevent an unstable operation of the switching power supply circuit 10 caused by the "operation mode" being switched more than necessary.

In an embodiment of the present disclosure, this "waiting time T1" is set at the time of transition from the operation mode corresponding to a load having the lowest power consumption, i.e., the "normal mode", to the "low frequency burst mode" or the "high frequency burst mode". Note that the "waiting time T1" may be set at the time of only either the transition from the "normal mode" to the "low frequency burst mode" or the transition from the "normal mode" to the "high frequency burst mode".

Operation of Switching Power Supply Circuit 10

Figure 12:
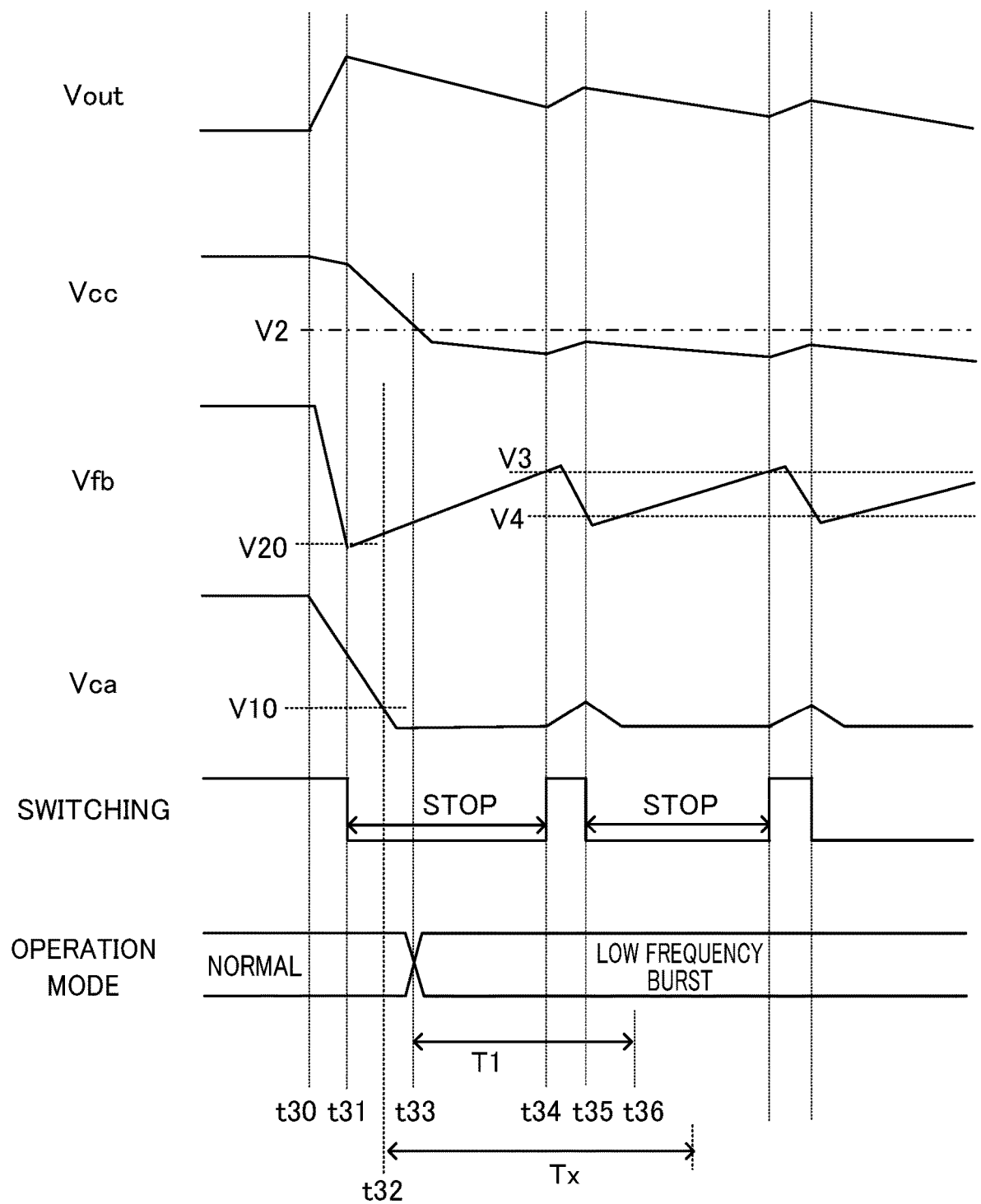
FIG. 12 is a diagram for explaining a switching power supply circuit 10.

FIG. 12 is a diagram illustrating the operation of the switching power supply circuit 10 when the load 11 is in a light load state. It is assumed here that the switching power supply circuit 10 operates in the "normal mode" at and before time t30.

First, when the load 11 becomes a light load state at the time t30, the output voltage Vout rises, and thus the feedback voltage Vfb drops, and the voltage Vca drops.

Then, when the feedback voltage Vfb drops to the "voltage V20" at time t31, the control circuit 76 outputs the control signal CONT indicative of "Stop" (process S10 in FIG. 10). As a result, the switching operation is stopped, so that rise in the output voltage Vout is stopped.

Further, when "Condition 3 (Vfb<V6 and Vca<V10)" is satisfied at time t32, the control circuit 76 starts measuring the "predetermined time period Tx" to shift the operation mode to the "low frequency burst mode".

However, since the switching operation is stopped at the time t31, the power supply voltage Vcc significantly drops. Note that since this timing is a timing before the "predetermined time period Tx" has elapsed to shift the operation mode to the "low frequency burst mode", the switching power supply circuit 10 does not operate.

Further, when the power supply voltage Vcc drops to the voltage V2 at time t33, the control circuit 76 outputs the control signal CONT indicative of the "low frequency burst mode" (process S22 in FIG. 10). In other words, the process S22 is performed, when Condition 3 is satisfied and before the predetermined time period Tx has elapsed. As a result, the "operation mode" of the switching power supply circuit 10 is shifted to the "low frequency burst mode".

Then, when the feedback voltage Vfb rises with drop in the output voltage Vout and reaches the voltage V3 at time t34, the switching operation is performed. As a result, the power supply voltage Vcc rises, thereby being able to prevent the power supply voltage Vcc of the control IC 40 from dropping more than necessary.

When the switching operation is performed at time t34, the output voltage Vout rises, and thus the feedback voltage Vfb drops. Further, since the power consumption of the load 11 increases with rise in the output voltage Vout, the voltage Vca rises.

Then, when the feedback voltage Vfb drops to the voltage V4 at time t35, the switching operation is stopped. Accordingly, when the load 11 is in the light load state, the switching power supply circuit 10 intermittently stops performing switching and thus operates in the "low frequency burst mode", thereby being able to generate the output voltage Vout of a target level while enhancing efficiency.

Note that, although not illustrated in FIG. 12, for example, if the power consumption of the load 11 increases at time t36, at which the waiting time T1 has elapsed from the time t33, and thereafter, the output voltage Vout drops, and the feedback voltage Vfb rises. Then, "Condition 4 (Vfb>V5 or Vca>V9)" is satisfied, the control circuit 76 outputs the control signal CONT indicative of the "normal mode" (process S40 in FIG. 10). As a result, the switching power supply circuit 10 operates in the "normal mode".

Further, when the voltage Vca is high (Vca>V9) at the t36 and thereafter, the control circuit 76 outputs the control signal CONT indicative of the "normal mode" (process S40 in FIG. 10). As a result, the switching power supply circuit 10 operates in the "normal mode".

When the switching power supply circuit 10 operates in the "normal mode", the switching period is longer than the switching period in the case of operating in the "high frequency burst mode". Thus, by shifting the "operation mode" of the switching power supply circuit 10 from the "low frequency burst mode" to the "normal mode", reduction in the output voltage Vout can be suppressed even if increase in the power consumption of the load 11 is large.

Other

For example, during the operation of the switching power supply circuit 10 in the "normal mode", if the switching frequency becomes extremely high, the power consumption in the NMOS transistors 22, 23, and the like increases, so that the power supply voltage Vcc may significantly drop. Thus, for example, the control circuit 76 may output the control signal CONT indicative of the "low frequency burst mode" when the power supply voltage Vcc becomes lower than the "voltage V2".

In other words, in the process S22 in FIG. 10, when Condition 5 (Vfb<V20 and Vcc<V2)" is satisfied, the operation mode is to be shifted to the "low frequency burst mode", however, a configuration may be such that the operation mode is shifted to the "low frequency burst mode" when only the power supply voltage Vcc drops below the voltage V2. Such a configuration can prevent the power supply voltage Vcc of the control IC 40 from dropping more than necessary.

Further, the control IC 40 according to an embodiment of the present disclosure is used in the switching power supply circuit 10, which is an LLC current resonant converter, however, it is not limited thereto. For example, the control IC 40 may be used in a flyback switching power supply circuit. Note that, in the switching power supply circuit 10, the NMOS transistors 22, 23 that control a current of the primary coil L1 corresponds to first and second transistors.

Further, in an embodiment of the present application, the control circuit 76 is a logic circuit that changes the control signal CONT according to an input condition, however, it is not limited thereto. For example, the control circuit 76 may be a microcomputer (controller) that execute a program stored in memory (not illustrated). Further, the drive signal output circuit 75 can be realized using a functional block (e.g., drive signal output unit) of a microcomputer. Even in a case where such a microcomputer is used, a function similar to the function in an embodiment of the present disclosure can be realized.

Further, in an embodiment of the present disclosure, the AD converters 71, 73 convert the feedback voltage Vfb and the voltage Vca into digital values, and the digital control circuit 78 outputs the drive signals Vdr1, Vdr2, however, it is not limited thereto. For example, the control IC 40 may include various analog circuit(s) and/or digital circuit(s) so as to output the drive signals Vdr1, Vdr2 similar to those in an embodiment of the present disclosure based on the feedback voltage Vfb and the voltage Vca of analog values. Even in such a case, effects as in an embodiment of the present disclosure can be obtained.

Summary

Hereinabove, the switching power supply circuit 10 according to an embodiment of the present disclosure has been described. During the operation of the switching power supply circuit 10 in the "normal mode", the "first transition condition" that Condition 3 continues for the "predetermined time period Tx" is satisfied or Condition 5 (Vfb<V20 and Vcc<V2) not including time, which corresponds to the "second transition condition", is satisfied, the switching power supply circuit 10 operates in the "low frequency burst mode". This can enhance efficiency of the switching power supply circuit 10 while suppressing reduction in the power supply voltage Vcc, thereby being able to operate the switching power supply circuit 10 in an appropriate "operation mode".

Further, if the load 11 continues to be in the light load state, for example, Condition 3 results in continuing for the "predetermined time period Tx", thereby satisfying the "first transition condition". Accordingly, the switching power supply circuit 10 can be reliably shifted to the "low frequency burst mode" when the load 11 continues to be in the light load state.

Further, for example, during the operation of the switching power supply circuit 10 in the "normal mode", if the switching frequency becomes extremely high, the power supply voltage Vcc may significantly drop. For example, when the power supply voltage Vcc becomes lower than the "voltage V2 (first level)", the operation mode is shifted to the "low frequency burst mode", thereby being able to prevent the power supply voltage Vcc of the control IC 40 from dropping more than necessary. Accordingly, such a configuration enables the switching power supply circuit 10 to operate in an appropriate "operation mode".

Further, the control circuit 76 shifts the "operation mode" to the "low frequency burst mode", for example, when the load 11 is in the light load state and the power supply voltage Vcc drops below the "voltage V2". This can enhance the efficiency of the switching power supply circuit 10.

Further, in an embodiment of the present disclosure, whether the load 11 is a light load is determined, for example, based on whether "Condition 3 (Vfb<V6 and Vca <V10)" is satisfied, however, it is not limited thereto.

For example, the control circuit 76 may determine whether the load 11 is a light load based on either the state in which the feedback voltage Vfb is lower than the voltage V6 or the state in which the voltage Vca is lower than the voltage V10. Even in such a case, whether the load 11 is a light load can be reliably determined.

Further, the control circuit 76 stops a switching operation when the load 11 has become a light load and the output voltage Vout rises and the feedback voltage Vfb reaches the voltage V20 of the predetermined level (for example, process S10 in FIG. 10). This can suppress overshoot of the output voltage Vout. Further, the execution of such a process S10 causes the power supply voltage Vcc to significantly drop. In an embodiment of the present disclosure, when the power supply voltage Vcc reaches the "voltage V2" before the light load state continues for the "predetermined time period Tx", the operation mode is immediately shifted to the "low frequency burst mode". This can prevent the power supply voltage Vcc from significantly dropping.

Further, the control circuit 76 changes the "operation mode" to the "high frequency burst mode" or the "low frequency burst mode" according to the power consumption of the load 11, during the operation of the switching power supply circuit 10 in the "normal mode". In contrast, the control circuit 76 changes the "operation mode" to the "normal mode" without fail when the power consumption of the load 11 increases during the operation of the switching power supply circuit 10 in the "low frequency burst mode".

This can increase the power consumption of the load 11, thereby being able to stabilize the output voltage Vout at the time of a heavy load.

Further, the control circuit 76 does not change the "operation mode" until at least the predetermined "waiting time T1" has elapsed, at the time of transition from the "normal mode" to the "high frequency burst mode or low frequency burst mode". This can prevent an unstable operation of the switching power supply circuit 10 caused by the operation mode of the switching power supply circuit 10 being switched more than necessary.

Accordingly, in an embodiment of the present disclosure, the "operation mode" of the switching power supply circuit 10 is changed directly to the "normal mode" from the "low frequency burst mode" for the case in which the power consumption of the load 11 is the lowest, among a plurality of "burst modes". Accordingly, it is not necessary to sequentially use all the "burst modes" to stabilize the output voltage Vout, particularly when the load 11 has become a heavy load.

Note that, in an embodiment of the present disclosure, the "burst modes" are two modes of the "low frequency burst mode" and the "high frequency burst mode". However, for example, there may be more than two "burst modes". Even in such a case, the effects as in an embodiment of the present disclosure can be obtained by directly transitioning from the "burst mode" for the case in which the power consumption of the load 11 is the lowest to the "normal mode" without passing through another "burst mode".

Further, a signal generated when the "low frequency burst mode" or the "high frequency burst mode" is selected is illustrated in, for example, FIGS. 4, 5, and 7, however, it is not limited thereto. For example, the signal may be any signal as long as the switching operation can be intermittently stopped.

The foregoing embodiment(s) of the present disclosure is/are simply for facilitating the understanding of the present disclosure and is/are not in any way to be construed as limiting the present disclosure. The present disclosure may variously be changed or altered without departing from its gist and encompass equivalents thereof.

What is claimed is:

1. A switching control circuit for controlling a power supply circuit that includes
a transformer including a primary coil provided on a primary side, a secondary coil provided on a secondary side, and an auxiliary coil magnetically coupled to the primary coil or the secondary coil, and a transistor that controls a current of the primary coil, and that is configured to generate an output voltage of a target level on the secondary side, the power supply circuit having a load connected to an output thereof, the switching control circuit being configured to operate based on a power supply voltage that corresponds to a voltage from the auxiliary coil of the power supply circuit, and control switching of the transistor, the switching control circuit comprising:

a drive signal output circuit that outputs a drive signal that corresponds to an operation mode of the power supply circuit, the operation mode including a normal mode and a burst mode;

a drive circuit that performs the switching of the transistor based on the drive signal outputted by the drive signal output circuit; and a control circuit that receives the power supply voltage, a feedback voltage corresponding to the output voltage and a voltage corresponding to input power on the primary side, determines whether the load is a light load based on the feedback voltage and/or the voltage corresponding to the input power on the primary side, outputs, to the drive signal output circuit, a control signal for operating the power supply circuit in the burst mode, when a first transition condition is satisfied, the first transition condition including time as a condition, outputs, to the drive signal output circuit, the control signal for operating the power supply circuit in the normal mode, when a second transition condition is satisfied, the second transition condition not including time as a condition, outputs to the drive signal output circuit, the control signal for operating the power supply circuit in the burst mode, responsive to satisfaction of the first transition condition that includes the load continuing to be a light load for a predetermined time period, and outputs, when the power supply circuit operates in the burst mode, to the drive signal output circuit, the control signal for operating the power supply circuit in the normal mode, responsive to satisfaction of the second transition condition that includes the feedback voltage becoming higher than a threshold level or the voltage corresponding to input power on the primary side becoming higher than another threshold level.

2. The switching control circuit according to claim 1, wherein the control circuit causes the drive circuit to stop driving the transistor, when the output voltage rises above the target level and a feedback voltage corresponding to the output voltage reaches the threshold level.

3. The switching control circuit according to claim 1, wherein the operation mode includes a plurality of burst modes including said burst mode, the control circuit sends the control signal to the drive signal output circuit, to thereby cause the drive signal output circuit to output the drive signal for operating the power supply circuit in one of the burst modes that corresponds to power consumption of the load, when the power consumption of the load decreases during an operation of the power supply circuit in the normal mode, and in the normal mode, when the power consumption of the load increases during the operation of the power supply circuit in one of the burst modes in which the load has lowest power consumption.

4. The switching control circuit according to claim 3, wherein the control circuit causes the drive signal output circuit to output the drive signal for operating the power supply circuit in the normal mode, at a time of transition to the normal mode from the one burst mode in which the load has the lowest power consumption.

5. A switching control circuit for controlling a power supply circuit that includes a transformer including a primary coil provided on a primary side, a secondary coil provided on a secondary side, and an auxiliary coil magnetically coupled to the primary coil or the secondary coil, a capacitor connected to the primary coil, and a first transistor and a second transistor that control a resonant current of the primary coil and the capacitor, and that are configured to generate an output voltage of a target level on the secondary side, the power supply circuit having a load connected to an output thereof, the switching control circuit being configured to operate based on a power supply voltage that corresponds to a voltage from the auxiliary coil of the power supply circuit, and control switching of the first and second transistors, the switching control circuit comprising:

a drive signal output circuit that outputs a drive signal that corresponds to an operation mode of the power supply circuit, the operation mode including a normal mode, a first burst mode, and a second burst mode;

a drive circuit that performs the switching of the first and the second transistors based on the drive signal outputted by the drive signal output circuit; and a control circuit that sends a control signal to the drive signal output circuit, to thereby cause the drive signal output circuit to output the drive signal for operating the power supply circuit, wherein the drive circuit performs a first switching operation by which the first and the second transistors repeatedly alternately turn ON and turn OFF in the normal mode, the drive circuit performs a second switching operation by which a first operation time, in which the first and second transistors repeatedly alternately turn ON and turn OFF, and a second operation time, in which both the first and second transistors turn OFF, repeat alternately in the first burst mode, the drive circuit performs a third switching operation by which a third operation time, in which the first and second transistors repeatedly alternately turn ON and turn OFF, and a fourth operation time, in which both the first and second transistors turn OFF, repeat alternately in the second burst mode, a first ratio of the first operation time to the second operation time is larger than a second ratio of the third operation time to the fourth operation time, the control signal corresponds to power consumption of the load in one of the first and second burst modes, when the power consumption of the load decreases during an operation of the power supply circuit in the normal mode, and the control signal corresponds to the power consumption of the load in the normal mode, when the power consumption of the load increases during an operation of the power supply circuit in one of the first and second burst modes in which the load has lowest power consumption.

6. The switching control circuit according to claim 5, wherein
the control circuit causes the drive signal output circuit to output the drive signal for operating the power supply circuit in the normal mode, at a time of transition to the normal mode from the one of the first and second burst modes.

7. A power supply circuit comprising:
a transformer that includes a primary coil provided on a primary side, a secondary coil provided on a secondary side, and an auxiliary coil magnetically coupled to the primary coil or the secondary coil;
a transistor that controls a current of the primary coil; and
a switching control circuit that operates based on a power supply voltage that corresponds to a voltage from the auxiliary coil, and controls switching of the transistor, the power supply circuit being configured to generate an output voltage of a target level on the secondary side, the switching control circuit including
a drive signal output circuit that outputs a drive signal that corresponds to an operation mode of the power supply circuit, the operation mode including a normal mode and a burst mode,
a drive circuit that performs the switching of the transistor based on the drive signal outputted by the drive signal output circuit, and
a control circuit that
receives the power supply voltage, a feedback voltage corresponding to the output voltage and a voltage corresponding to input power on the primary side,
determines whether the load is a light load based on the feedback voltage and/or the voltage corresponding to the input power on the primary side,
outputs, to the drive signal output circuit, a control signal for operating the power supply circuit in the burst mode, when a first transition condition or a second transition condition is satisfied, the first transition condition including time as a condition, the second transition condition not including time as a condition,
outputs to the drive signal output circuit, the control signal for operating the power supply circuit in the burst mode, responsive to satisfaction of the first transition condition that includes the load continuing to be a light load for a predetermined time period, and
outputs, to the drive signal output circuit, the control signal for operating the power supply circuit in the burst mode, responsive to satisfaction of the second transition condition that includes the power supply voltage becoming lower than a threshold level.

8. A power supply circuit having a load connected to an output thereof, comprising:
a transformer that includes a primary coil provided on a primary side, a secondary coil provided on a secondary side, and an auxiliary coil magnetically coupled to the primary coil or the secondary coil;
a capacitor connected to the primary coil,
a first transistor and a second transistor that control a resonant current of the primary coil and the capacitor; and
a switching control circuit that operates based on a power supply voltage that corresponds to a voltage from the auxiliary coil, and controls switching of the first and second transistors, the power supply circuit being configured to generate an output voltage of a target level on the secondary side, the switching control circuit including
a drive signal output circuit that outputs a drive signal that corresponds to an operation mode of the power supply circuit, the operation mode including a normal mode, a first burst mode, and a second burst mode;
a drive circuit that performs the switching of the first and the second transistors based on the drive signal outputted by the drive signal output circuit; and
a control circuit that sends a control signal to the drive signal output circuit, to thereby cause the drive signal output circuit to output the drive signal for operating the power supply circuit, wherein
the drive circuit performs a first switching operation by which the first and the second transistors repeatedly alternately turn ON and turn OFF in the normal mode,
the drive circuit performs a second switching operation by which a first operation time, in which the first and second transistors repeatedly alternately turn ON and turn OFF, and a second operation time, in which both the first and second transistors turn OFF, repeat alternately in the first burst mode,
the drive circuit performs a third switching operation by which a third operation time, in which the first and second transistors repeatedly alternately turn ON and turn OFF, and a fourth operation time, in which both the first and second transistors turn OFF, repeat alternately in the second burst mode,
a first ratio of the first operation time to the second operation time is larger than a second ratio of the third operation time to the fourth operation time,
the control signal corresponds to power consumption of the load in one of the first and second burst modes, when the power consumption of the load decreases during an operation of the power supply circuit in the normal mode, and
the control signal corresponds to the power consumption of the load in the normal mode, when the power consumption of the load increases during an operation of the power supply circuit in one of the first and second burst modes.

* * * * *